(12) United States Patent
Van Dyk et al.

(10) Patent No.: US 8,128,898 B2
(45) Date of Patent: Mar. 6, 2012

(54) REMOVAL OF HYDROGEN CYANIDE FROM SYNTHESIS GAS

(75) Inventors: Braam Van Dyk, Vaalpark (ZA); John Marriott, Bryanston (ZA); Bavanethan Pillay, Johannesburg (ZA); Hendrik Johannes Van Der Westhuizen, Sasolburg (ZA); Ronél Combrink, Vanderbijlpark (ZA); Trevor David Phillips, Vanderbijlpark (ZA); Denise Louisette Venter, Vaalpark (ZA); André Peter Steynberg, Vanderbijlpark (ZA)

(73) Assignee: Sasol Techonology (Proprietary) Limited, Johannesburg (ZA)

( * ) Notice: Subject to any disclaimer, the term of this patent is extended or adjusted under 35 U.S.C. 154(b) by 0 days.

(21) Appl. No.: 12/513,077

(22) PCT Filed: Oct. 29, 2007

(86) PCT No.: PCT/IB2007/054378
§ 371 (c)(1),
(2), (4) Date: Aug. 13, 2009

(87) PCT Pub. No.: WO2008/053421
PCT Pub. Date: May 8, 2008

(65) Prior Publication Data
US 2010/0061905 A1    Mar. 11, 2010

(30) Foreign Application Priority Data

Oct. 31, 2006  (ZA) ................................. 2006/09076

(51) Int. Cl.
B01D 53/14    (2006.01)
C01C 3/02     (2006.01)
C07C 253/00   (2006.01)

(52) U.S. Cl. ........ 423/236; 423/372; 558/351; 558/345; 558/346

(58) Field of Classification Search ................. None
See application file for complete search history.

(56) References Cited

U.S. PATENT DOCUMENTS 3,950,492 A    4/1976  Haese
(Continued)

FOREIGN PATENT DOCUMENTS

FR      2254361 A     7/1975
(Continued)

OTHER PUBLICATIONS

International Preliminary Report on Patentability from PCT/IB2007/054378 dated Feb. 2, 2009.

*Primary Examiner* — Melvin Mayes
*Assistant Examiner* — Sheng H Davis
(74) *Attorney, Agent, or Firm* — Pillsbury Winthrop Shaw Pittman LLP

(57) ABSTRACT

A process (10) for at least partially removing hydrogen cyanide from synthesis gas includes feeding a synthesis gas (30) containing hydrogen cyanide to a gas-liquid contacting stage (18) and, in the gas-liquid contacting stage (18), contacting the synthesis gas with an aqueous washing solution (36) comprising at least one dissolved metal salt, with metal cations of the metal salt being capable of forming metal cyanide complexes and/or metal cyanide precipitates, and weak acid anions of the metal salt serving to buffer the pH of the washing solution in a range between 6 and 10. Hydrogen cyanide is washed from the synthesis gas by the washing solution to form a treated synthesis gas (38) and a spent washing solution (40). From time to time or continuously, at least a portion of the spent washing solution is withdrawn from the gas-liquid contacting stage. The treated synthesis gas (38) is also withdrawn from the gas-liquid contacting stage.

10 Claims, 1 Drawing Sheet

U.S. PATENT DOCUMENTS

| | | | | |
|---|---|---|---|---|
| 4,704,137 | A | * | 11/1987 | Richter ........................ 48/197 R |
| 5,705,078 | A | * | 1/1998 | Kurek et al. ................... 210/759 |
| 5,756,803 | A | * | 5/1998 | Casse et al. .................... 558/351 |
| 5,976,868 | A | * | 11/1999 | Buisman ....................... 435/266 |
| 6,063,349 | A | | 5/2000 | Koveal |
| 6,765,110 | B2 | * | 7/2004 | Warner et al. ................. 560/265 |
| 2004/0091409 | A1 | | 5/2004 | Allison |

FOREIGN PATENT DOCUMENTS

| | | | |
|---|---|---|---|
| GB | 2187725 | * | 3/1987 |
| SU | 960127 | * | 9/1982 |

* cited by examiner

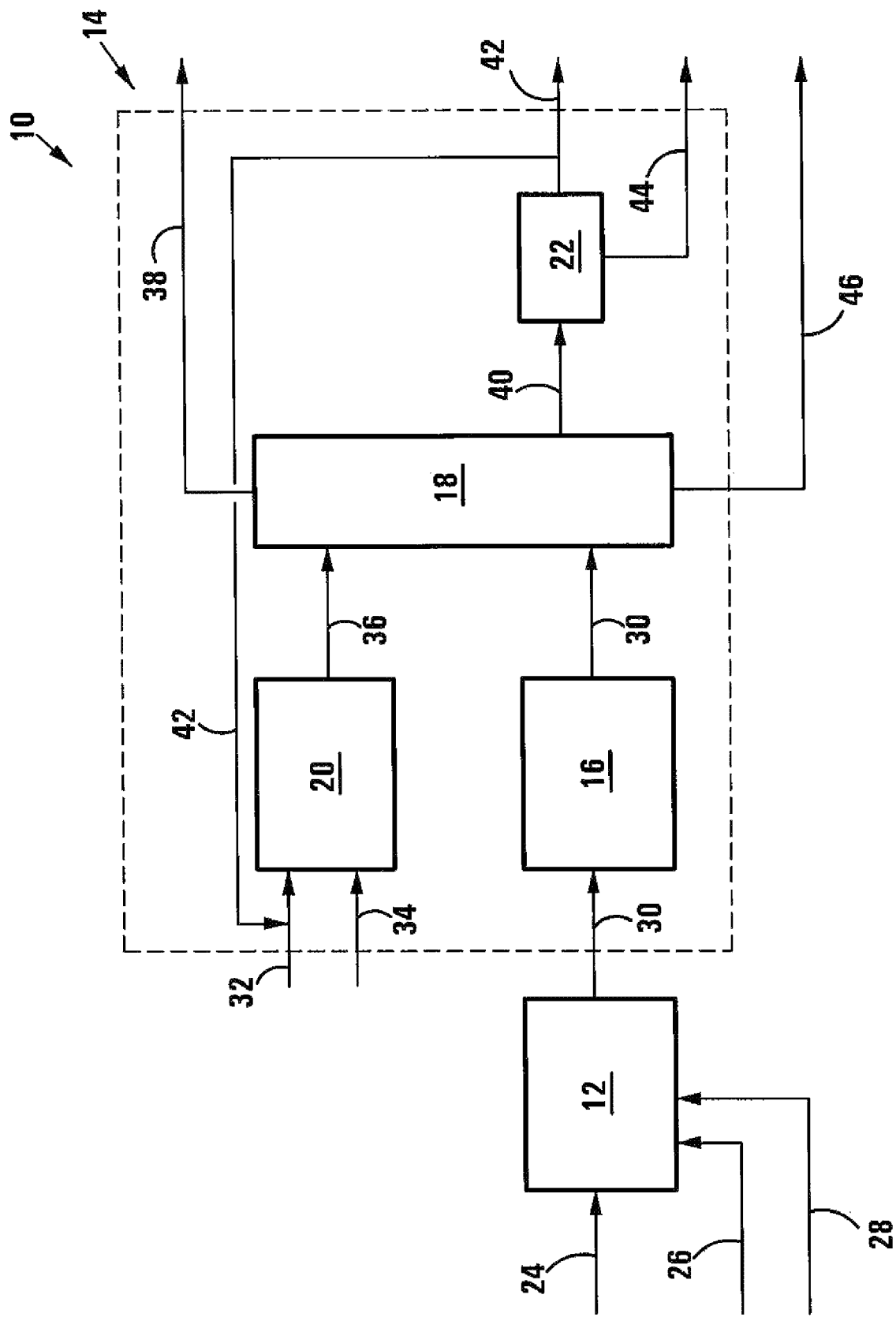

REMOVAL OF HYDROGEN CYANIDE FROM SYNTHESIS GAS

CROSS-REFERENCE TO RELATED APPLICATIONS

This is the U.S. National Stage of Intl. Patent Appl. No. PCT/IB2007/054378, filed Oct. 29, 2007, which in turn claims priority to South African Patent Application No. 2006/09076, filed Oct. 31, 2006 the entire contents of both applications are incorporated herein by reference in their entireties.

THIS INVENTION relates to a process for the removal of hydrogen cyanide from synthesis gas.

Synthesis gas, a mixture of predominantly hydrogen and carbon monoxide, is commonly used in the chemical process industries. It is, for example, a feedstock in methanol synthesis, dimethyl ether synthesis, Fischer-Tropsch synthesis, and hydroformylation synthesis.

Processes for the production of synthesis gas include gasification of coal or biomass feedstocks, and reforming of gaseous hydrocarbon feedstocks such as natural gas, methane, and other light hydrocarbons.

In addition to hydrogen and carbon monoxide, synthesis gas typically includes carbon dioxide, nitrogen, methane, hydrogen cyanide, and ammonia.

Hydrogen cyanide is a potential catalyst poison for many processes in which synthesis gas is utilised. The Inventors believe that a process which effectively removes hydrogen cyanide from synthesis gas will be an advantage. Such a process which does not substantially remove carbon dioxide from the synthesis gas will be even more desirable.

Accordingly, the invention provides a process for at least partially removing hydrogen cyanide from synthesis gas, the process including:

feeding a synthesis gas containing hydrogen cyanide to a gas-liquid contacting stage;

in the gas-liquid contacting stage, contacting the synthesis gas with an aqueous washing solution comprising at least one dissolved metal salt, with metal cations of the metal salt being capable of forming metal cyanide complexes and/or metal cyanide precipitates, and weak acid anions of the metal salt serving to buffer the pH of the washing solution in a range between 6 and 10, with hydrogen cyanide being washed from the synthesis gas by the washing solution to form a treated synthesis gas and a spent washing solution;

withdrawing, from time to time or continuously, at least a portion of the spent washing solution from the gas-liquid contacting stage; and withdrawing the treated synthesis gas from the gas-liquid contacting stage.

A solution is buffered when it resists changes in pH. Certain compounds, such as carbon dioxide, typically present in the synthesis gas will tend to lower the pH of the washing solution. Hydrogen cyanide has a very low solubility in water at low pH values and it is thus desirable to keep the pH of the washing solution at a sufficiently high value to promote the uptake of hydrogen cyanide in the washing solution. The pH should however not be so high as to promote excessive removal of carbon dioxide from the synthesis gas. The weak acid anions thus serve to maintain the pH of the washing solution within the range of 6 to 10.

The washing solution may comprise a single dissolved metal salt. The applicant however expects that in practice in the majority of applications the washing solution will comprise more than one dissolved metal salt. The washing solution may include metal salts in a concentration in a range of 1 to 20 mass %, preferably in a concentration in a range of 1 to 10 mass %, more preferably in a concentration of 1 to 5 mass %.

The concentration of the metal cations capable of forming metal cyanide complexes and/or metal cyanide precipitates in the washing solution may be in the range of 0.1 to 4 mass % and the concentration of the weak acid anions in the washing solution may be in the range of 0.5 to 8 mass %.

The metal salts may include one or more iron-, copper-, cobalt-, silver-, gold-, and/or other transition metal salts, but are preferably iron or copper salts.

The weak acid anions are preferably derived from organic acids, i.e. they are preferably carboxylates.

The weak acid anions may be derived from carboxylates selected from the group consisting of citrate, oxalate, acetate, and propionate. Preferably, the weak acid anions are derived from acetate.

The mass flow ratio of the synthesis gas to the washing solution in the gas-liquid contacting stage may be in the range of 1 to 40, more preferably 30 to 40.

The level of hydrogen cyanide in the synthesis gas fed to the gas-liquid contacting stage may be in the range from 1 to 300 ppmv.

The level of hydrogen cyanide in the treated synthesis gas may be below 1000 ppbv, preferably below 500 ppbv.

The gas-liquid contacting stage may be operated at temperatures between 40 and 200° C., more preferably at temperatures between 45 and 70° C. Typically, synthesis gas is produced at much higher temperatures. The process may thus include, in a synthesis gas cooling stage, cooling the synthesis gas before feeding it to the gas-liquid contacting stage.

The gas liquid-contacting stage may be operated at pressures between 10 and 40 bar, or even higher.

The gas-liquid-contacting stage may be a bubble column or an absorption column, preferably the latter.

The process may further include preparing fresh washing solution in a washing solution preparation stage. The fresh washing solution may be prepared by dissolving the metal salt or salts in water, typically at temperatures between ambient and the boiling point of water. The dissolution may be aided by mechanical mixing.

Alternatively, the fresh washing solution may be prepared by passing an aqueous solution containing one or more weak acids over a high surface area source of metal, such as scrap metal or metal filings, thereby to form the dissolved metal salts by reaction. Fischer-Tropsch synthesis generally results in the formation of a reaction water product containing oxygenated hydrocarbons, including organic acids. Where the treated synthesis gas is used for Fischer-Tropsch synthesis, the reaction water product or a product derived therefrom may thus be routed to the washing solution preparation stage to serve as the aqueous solution containing weak acids.

The process may further include treating the spent washing solution in a washing solution treatment stage.

Treating the spent washing solution may include thermally decomposing the metal cyanide complexes and/or precipitates. The recovered hydrogen cyanide may then be incinerated. The washing solution treatment stage may then include a distillation column in which the thermal decomposition is effected.

Alternatively, treating spent washing solution may include biologically decomposing the metal cyanide complexes and/or precipitates using micro-organisms. The spent washing solution may thus be fed into an activated sludge basin of a biological water treatment facility. The washing solution treatment stage may thus be an integral part of a biological water treatment facility.

In yet a further alternative, treating the spent washing solution may include precipitating the metal cyanide complexes by dosing excess metal salts to form metal cyanide precipitates, and then removing the precipitates using for example filtration (ultra- or nanofiltration), flotation (including dissolved air flotation), or reverse osmosis.

In yet a further alternative still, treating the spent washing solution may include oxidation using e.g. hydrogen peroxide or ozone. The oxidation treatment may or may not involve UV radiation.

The process may further include recycling treated water from the washing solution treatment stage as make-up to the washing solution preparation stage.

The synthesis gas may include condensable hydrocarbon components. The process may then include condensing at least some of the condensable hydrocarbon components in the gas-liquid contacting stage, forming a hydrocarbon condensate, and withdrawing the hydrocarbon condensate from the gas-liquid contacting stage.

Further features of the invention will become apparent from the following description presented by way of example with reference to the single accompanying diagrammatic drawing, which shows a process for the production of treated synthesis gas, including a process for the treatment of synthesis gas in accordance with the invention.

With reference to the drawing, reference numeral 10 generally indicates a process for the production of treated synthesis gas, comprising a synthesis gas generation stage 12, and a synthesis gas treatment process, generally indicated by reference numeral 14, in accordance with the invention.

The treatment process 14 includes a synthesis gas cooling stage 16, a gas liquid-contacting stage 18, a washing solution preparation stage 20, and a washing solution treatment stage 22.

A feedstock line or stream 24, an oxygen line 26 and a high pressure steam line 28 all lead to the synthesis gas generation stage 12. The synthesis gas generation stage 12 may include either a gasification stage or a reforming stage or both, depending on the available feedstock. Details of the gasification stage and/or the reforming stage are not shown but are well known to those skilled in the art. The synthesis gas generation stage 12 is thus, with potentially some process differences related to the selected feedstock, typically a conventional synthesis gas generation stage.

A synthesis gas line 30 leads from the synthesis gas generation stage 12 to the cooling stage 16 and from there to the gas-liquid contacting stage 18. The cooling stage 16 typically includes a combination of process heat exchangers, air coolers and/or water coolers.

A make-up water line 32 and metal salts line or stream 34 lead to the washing solution preparation stage 20. A washing solution line 36 leads from the preparation stage 20 to the gas-liquid contacting stage 18.

The gas-liquid contacting stage 18 may be any standard gas-liquid contacting device, e.g. a bubble column or an absorption column, but typically is an absorption column.

A treated synthesis gas line 38, a spent washing solution line 40, and a condensable product line 46 all lead from the gas-liquid contacting stage 18.

The spent washing solution line 40 leads to the washing solution treatment stage 22, from where there leads a treated washing solution line 42 and a sludge line 44. The treated washing solution line 42 splits in two, with one branch joining the make-up water line 32 prior to it entering the preparation stage 20.

In use, feedstock, oxygen-containing gas and high pressure steam are fed to the synthesis gas generation stage 12 along the feedstock line or stream 24, the oxygen line 26 and the steam line 28 respectively. In the embodiment shown, the oxygen-containing gas is high purity oxygen derived from an air separation unit (not shown). Alternatively, the oxygen-containing gas may for example be air or oxygen-enriched air. A synthesis gas, comprising predominantly hydrogen and carbon monoxide, and also carbon dioxide, hydrogen cyanide and ammonia, formed in the synthesis gas generation stage 12 is withdrawn along the synthesis gas line 30 at elevated temperatures. The synthesis gas typically contains up to 300 ppmv hydrogen cyanide.

The synthesis gas withdrawn along the synthesis gas line 30 is cooled in the cooling stage 16 to temperatures in the range from 40 to 200° C., typically in the range of 45 to 70° C., and the cooled synthesis gas is then fed to the gas-liquid contacting stage 18.

In the gas-liquid contacting stage 18, the cooled synthesis gas is contacted with an aqueous washing solution comprising dissolved metal salts, including metal salts of weak acids, thereby to wash the hydrogen cyanide (and ammonia) from the cooled synthesis gas. Typically the washing solution contains metal salts in the range of 1 to 20 mass %, more typically 1 to 10 mass %, even more typically 1 to 5 mass %. Cations of the metal salts are selected to be capable of forming metal cyanide complexes and/or metal cyanide precipitates. The salts may thus include iron-, copper-, cobalt-, silver-, gold-, and/or other transition metal salts, but are preferably iron- or copper salts. In this manner, the capacity of the washing solution for hydrogen cyanide is increased, advantageously resulting in a reduced requirement for washing solution. Typically, the concentration of the metal cations capable of forming metal cyanide complexes and/or metal cyanide precipitates are in the range of 0.1 to 4 mass %.

Certain compounds, such as carbon dioxide, typically present in the synthesis gas, will tend to lower the pH of the washing solution. This is undesirable, since the metal cyanide complexes and/or metal cyanide precipitates are not stable at low pH values, and, in addition, hydrogen cyanide has very low solubility in water at low pH values.

Furthermore, undesirable excessive washing of carbon dioxide from the cooled synthesis gas takes place if the pH of the washing solution is too high. Excessive washing of carbon dioxide is undesirable since it often negatively impacts the overall carbon efficiency of a downstream process utilising the synthesis gas, or it promotes the undesirable formation of more carbon dioxide through water-gas shift, using valuable carbon monoxide.

The pH of the washing solution should thus ideally be in the range from 6 to 10 to ensure acceptable washing of hydrogen cyanide and stability of the metal cyanide complexes and/or metal cyanide precipitates, while simultaneously avoiding excessive washing of carbon dioxide. Weak acid anions of the metal salts thus serve to buffer the pH of the washing solution between 6 and 10. Preferably the weak acid anions are derived from carboxylic acids, i.e. they preferably are carboxylates. Suitable carboxylates are citrate, oxalate, acetate, and propionate, most preferably acetate. A skilled person will appreciate that the concentration of the weak acid anions must be selected to achieve both the desired pH range and the required buffering capacity, and consequently will depend on inter alia the composition of the synthesis gas, especially the level of carbon dioxide, the ratio of the synthesis gas to fresh washing solution, and the operating temperature of the gas-liquid contacting stage 18, typically between 40 and 200° C. Typically the concentration of the weak acid anions are in the range of 0.5 to 8 mass %.

Typically the mass flow ratio of the synthesis gas to the washing solution in the gas-liquid contacting stage 18 is in the range of 1 to 40.

A treated synthesis gas having a reduced hydrogen cyanide content is withdrawn from the gas-liquid contacting stage 18 along line 38 and routed to downstream consumers (not shown). The treated synthesis gas typically has a hydrogen cyanide level below 1000 ppbv, preferably below 500 ppbv.

The fresh washing solution is prepared in the washing solution preparation stage 20, and then fed to the gas-liquid contacting stage 18 along the washing solution line 36.

In the embodiment of the process shown in the drawing, the fresh washing solution is prepared by dissolving metal salts, fed along metal salts line or stream 34, in water, fed along make-up water line 32. The dissolution is aided by mechanical mixing and occurs at a temperature between ambient and the boiling point of water.

In an alternative embodiment (not shown), the fresh washing solution may be prepared by passing an aqueous solution containing weak acids over a high surface area source of metal, such as scrap metal or metal filings, thereby to form the dissolved metal salts by reaction. Fischer-Tropsch synthesis generally results in the formation of a reaction water product containing oxygenated hydrocarbons, including organic acids. Where the treated synthesis gas is used for Fischer-Tropsch synthesis, the reaction water product or a product derived therefrom may thus be routed to the washing solution preparation stage to serve as the aqueous solution containing weak acids.

Spent washing solution is withdrawn from the gas-liquid contacting stage 18 along the spent washing solution line 40 and is fed to the washing solution treatment stage 22. Various technologies may be utilised for the treatment of the spent washing solution, including thermal decomposition, biological decomposition, precipitation and filtration, and oxidation.

When thermal decomposition is utilised, the washing solution treatment stage 22 typically includes a distillation column in which the metal cyanide complexes and/or precipitates are thermally decomposed, with the recovered hydrogen cyanide then being incinerated.

Biological decomposition involves biologically decomposing the metal cyanide complexes and/or precipitates using micro-organisms. The spent washing solution is thus fed into an activated sludge basin of a biological water treatment facility. The washing solution treatment stage 22 may thus be an integral part of a biological water treatment facility.

Precipitation and filtration involves precipitating the metal cyanide complexes by dosing excess metal salts to form metal cyanide precipitates, and then removing the precipitates using for example filtration (ultra- or nanofiltration), flotation (including dissolved air flotation), or reverse osmosis. The washing solution treatment stage 22 thus typically includes suitable filtration-, flotation- or reverse osmosis equipment when utilising this technology.

Oxidation involves subjecting the spent washing solution to oxidation using e.g. hydrogen peroxide or oxygen. The oxidation treatment optionally also involves UV radiation.

Treated water from the washing solution treatment stage 22 is withdrawn along the treated washing solution line 42, with a portion being discharged from the system and the remainder recycled to the washing solution preparation stage 20 as make-up water. A sludge product (if present) is withdrawn from the washing solution treatment stage along the sludge line 44.

In addition to the components mentioned above, the cooled synthesis gas fed to the gas-liquid contacting stage 18, may also include condensable products. The gas-liquid contacting stage 18 may, if desired, be operated at such conditions, in particular temperature and pressure, that the condensable products are withdrawn from the gas-liquid contacting stage as a bottom product along the condensable product line 46. The Inventors believe that the process 14 provides an effective process for the removal of hydrogen cyanide from synthesis gas to levels acceptable to downstream users of synthesis gas, without substantially removing carbon dioxide.

The invention claimed is:

1. A process for at least partially removing hydrogen cyanide from synthesis gas to be used for Fischer-Tropsch synthesis and which includes carbon dioxide, the process including:
   feeding a synthesis gas containing hydrogen cyanide to a gas-liquid contacting stage;
   in the gas-liquid contacting stage, contacting the synthesis gas with an aqueous washing solution comprising at least one dissolved metal salt, with metal cations of the metal salt being capable of forming metal cyanide complexes and/or metal cyanide precipitates, and weak organic acid anions of the metal salt serving to buffer the pH of the washing solution in a range between 6 and 10, the washing solution including metal salts in a concentration in a range of 1 to 20 mass %, with hydrogen cyanide being washed from the synthesis gas by the washing solution to form a treated synthesis gas and a spent washing solution;
   withdrawing, from time to time or continuously, at least a portion of the spent washing solution from the gas-liquid contacting stage; and
   withdrawing the treated synthesis gas from the gas-liquid contacting stage.

2. The process as claimed in claim 1, in which the washing solution includes metal salts in a concentration in a range of 1 to 10 mass %.

3. The process as claimed in claim 1, in which the concentration of the metal cations capable of forming metal cyanide complexes and/or metal cyanide precipitates in the washing solution is in the range of 0.1 to 4 mass % and the concentration of the weak organic acid anions in the washing solution is in the range of 0.5 to 8 mass %.

4. The process as claimed in claim 1, in which the metal salts include one or more iron-, copper-, cobalt-, silver-, gold-, and/or other transition metal salts.

5. The process as claimed in claim 1, in which the weak organic acid anions are derived from carboxylates selected from the group consisting of citrate, oxalate, acetate, and propionate.

6. The process as claimed in claim 1, in which the gas-liquid contacting stage is operated at a temperature between 40° C. and 200° C.

7. The process as claimed in claim 6, in which the temperature is between 45° C. and 70° C.

8. The process as claimed in claim 1, which includes preparing fresh washing solution in a washing solution preparation stage, the fresh washing solution being prepared by passing an aqueous solution containing weak organic acids over a high surface area source of metal, thereby to form the dissolved metal salts by reaction.

9. The process as claimed in claim 8, in which the aqueous solution containing weak organic acids is, or is derived from, Fischer-Tropsch reaction water product.

10. The process as claimed in claim 1, in which the synthesis gas includes condensable hydrocarbon components, the process including
   condensing at least some of the condensable hydrocarbon components in the gas-liquid contacting stage, forming a hydrocarbon condensate, and
   withdrawing the hydrocarbon condensate from the gas-liquid contacting stage.

* * * * *